US010739437B2

(12) United States Patent
Toyao

(10) Patent No.: US 10,739,437 B2
(45) Date of Patent: Aug. 11, 2020

(54) FREQUENCY SELECTIVE SURFACE, WIRELESS COMMUNICATION DEVICE, AND RADAR DEVICE

(71) Applicant: NEC CORPORATION, Tokyo (JP)

(72) Inventor: Hiroshi Toyao, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 225 days.

(21) Appl. No.: 15/539,167

(22) PCT Filed: Jan. 26, 2016

(86) PCT No.: PCT/JP2016/000373
§ 371 (c)(1),
(2) Date: Jun. 23, 2017

(87) PCT Pub. No.: WO2016/121375
PCT Pub. Date: Aug. 4, 2016

(65) Prior Publication Data
US 2018/0017664 A1    Jan. 18, 2018

(30) Foreign Application Priority Data

Jan. 26, 2015  (JP) .................................. 2015-012452

(51) Int. Cl.
*G01S 7/03*  (2006.01)
*H01Q 15/00*  (2006.01)
(Continued)

(52) U.S. Cl.
CPC ........... *G01S 7/03* (2013.01); *H01Q 15/0066* (2013.01); *H01Q 15/14* (2013.01); *H01Q 19/10* (2013.01); *H01Q 19/185* (2013.01); *H01Q 21/06* (2013.01)

(58) Field of Classification Search
CPC ..... G01S 7/03; H01Q 15/0066; H01Q 19/185; H01Q 15/14; H01Q 19/10; H01Q 21/06
(Continued)

(56) References Cited

U.S. PATENT DOCUMENTS 2,586,895 A * 2/1952 Osborne ................. H01Q 1/247
                                                                                        333/26
3,210,766 A * 10/1965 Parker .................. H01Q 13/103
                                                                                        343/712
(Continued)

FOREIGN PATENT DOCUMENTS

JP   56-012106 A   2/1981
JP   2003-060430 A   2/2003
(Continued)

OTHER PUBLICATIONS

M. Safari et al., "X-Band Tunable Frequency Selective Surface Using MEMS Capacitive Loads"; IEEE Transactions on Antennas and Propagation; vol. 63, No. 3; Mar. 2015; pp. 1014-1021. Date of Publication Dec. 29, 2014 at bottom of p. 1014. (Year: 2015).*
(Continued)

*Primary Examiner* — Bernarr E Gregory
(74) *Attorney, Agent, or Firm* — Sughrue Mion, PLLC

(57) ABSTRACT

Provided is a frequency selective surface including a conductor plane (101), nine loop slots (102) each formed to be surrounded by the conductor plane (101), and a capacitance component (103) disposed to straddle the loop slots (102) in a width direction, both ends of the capacitance component being connected to the conductor plane (101) at a position near the loop slots (102). The conductor plane (101) and the loop slots (102) each formed to be surrounded by the conductor plane (101) constitute a unit cell (110). The unit cells (110) are two-dimensionally periodically arranged. One or more (four in the case of FIG. 1) capacitance components (103) disposed to straddle the loop slots (102)
(Continued)

in the width direction are provided for each loop slot (102). Operating frequencies can be easily changed by adjusting only a component connected to the unit cell, or a part of metallic patterns.

8 Claims, 10 Drawing Sheets

(51) Int. Cl.
    *H01Q 19/185*     (2006.01)
    *H01Q 19/10*     (2006.01)
    *H01Q 15/14*     (2006.01)
    *H01Q 21/06*     (2006.01)
    *G01S 7/00*     (2006.01)

(58) Field of Classification Search
    USPC .................................................. 343/767–771
    See application file for complete search history.

(56) References Cited

U.S. PATENT DOCUMENTS

| | | | | |
|---|---|---|---|---|
| 5,512,901 | A * | 4/1996 | Chen | G01S 7/032 342/175 |
| 7,095,627 | B2 * | 8/2006 | Yokota | H05K 9/0003 333/12 |
| 8,976,077 | B2 * | 3/2015 | Colburn | H01Q 15/0066 343/700 MS |
| 2002/0167456 | A1 * | 11/2002 | McKinzie, III | H01Q 15/0066 343/909 |
| 2002/0167457 | A1 * | 11/2002 | McKinzie, III | H01Q 15/0066 343/909 |
| 2003/0112186 | A1 * | 6/2003 | Sanchez | H01Q 15/0066 343/700 MS |
| 2006/0125703 | A1 * | 6/2006 | Ma | H01Q 13/103 343/767 |
| 2009/0058746 | A1 * | 3/2009 | Delgado | H01Q 15/0026 343/770 |
| 2010/0127943 | A1 * | 5/2010 | Inoue | H01Q 15/14 343/702 |
| 2011/0241948 | A1 * | 10/2011 | Bevelacqua | H01Q 1/243 343/702 |
| 2012/0098628 | A1 | 4/2012 | Batchelor et al. | |

FOREIGN PATENT DOCUMENTS

| | | |
|---|---|---|
| JP | 2004-297763 A | 10/2004 |
| JP | 2011-217269 A | 10/2011 |
| JP | 2012-085262 A | 4/2012 |
| WO | 2012/107976 A1 | 8/2012 |

OTHER PUBLICATIONS

International Search Report for PCT/JP2016/000373 dated Mar. 15, 2016 [PCT/ISA/210].

\* cited by examiner

FREQUENCY SELECTIVE SURFACE, WIRELESS COMMUNICATION DEVICE, AND RADAR DEVICE

CROSS REFERENCE TO RELATED APPLICATIONS

This application is a National Stage of International Application No. PCT/JP2016/000373, filed on Jan. 26, 2016, which claims priority from Japanese Patent Application No. 2015-012452, filed on Jan. 26, 2015, the contents of all of which are incorporated herein by reference in their entirety.

TECHNICAL FIELD

The present disclosure relates to a frequency selective surface, a wireless communication device, and a radar device, and more particularly, to a frequency selective surface, a wireless communication device and a radar device which include an antenna or an antenna array using the frequency selective surface. Note that, in some cases, the present disclosure can be configured as a single antenna device or antenna array device using the frequency selective surface.

BACKGROUND ART

In recent years, a technique ("metamaterial" technique) for controlling propagation characteristics of electromagnetic waves by periodically arranging conductor patterns having a specific structure has been proposed. In particular, it has been proposed that a technique called "frequency selective surface" to control transmission characteristics and reflectance characteristics of incident electromagnetic waves by a configuration in which specific conductor patterns are two-dimensionally periodically arranged as unit cells be applied to a Radome (radar dome) for a reflector of an antenna or a radar device.

In an "antenna device" described in Patent Literature 1 (Japanese Unexamined Patent Application Publication No. 2011-217269), a configuration in which a frequency selective surface on which ring-like conductor patterns are periodically arranged is provided on a back surface of an antenna is disclosed. The frequency selective surface disclosed in Patent Literature 1 can reflect electromagnetic waves only at antenna operating frequencies and transmit electromagnetic waves in the other frequency bands, thereby enabling a reduction in a radar cross section in the frequency bands other than the antenna operating frequencies.

Further, in an "antenna for reducing unwanted radiation" described in Patent Literature 2 (Japanese Unexamined Patent Application Publication No. 2003-60430), a configuration in which a frequency selective surface on which metallic pieces are periodically arranged is provided on a front surface of an array antenna is disclosed. The frequency selective surface disclosed in Patent Literature 2 can transmit electromagnetic waves only at antenna operating frequencies and reflect electromagnetic waves in the other frequency bands, thereby enabling a reduction in radiation at unwanted frequencies from the array antenna.

CITATION LIST

Patent Literature

[Patent Literature 1] Japanese Unexamined Patent Application Publication No. 2011-217269 (pages 4 to 5)

[Patent Literature 2] Japanese Unexamined Patent Application Publication No. 2003-60430 (pages 2 to 3)

SUMMARY OF INVENTION

Technical Problem

However, in the frequency selective surfaces disclosed in Patent Literature 1 and Patent Literature 2, the operating frequencies are determined depending on the size of metallic patterns (unit cells) periodically arranged. Accordingly, in order to change the operating frequencies, it is necessary to change the size of all metallic patterns, which makes it difficult to adjust the frequencies after design or after production.

Object of the Present Disclosure

The present disclosure has been made in view of the above-mentioned circumstances, and an object of the present disclosure is to provide a frequency selective surface, a wireless communication device, and a radar device which are capable of easily changing operating frequencies by adjusting only a component connected to a unit cell, or a part of metallic patterns.

Solution to Problem

In order to solve the above-mentioned problem, a frequency selective surface, a wireless communication device, and a radar device according to the present disclosure mainly employ the following characteristic configurations.

(1) A frequency selective surface according to the present disclosure includes: a conductor plane; one or more slots each formed to be surrounded by the conductor plane; and a capacitance element disposed to straddle the slot in a width direction, one end or both ends of the capacitance element being connected to the conductor plane at a position near the slot. One or more capacitance elements are provided for each slot, the one or more capacitance elements being disposed to straddle the slot in the width direction.

(2) A wireless communication device according to the present disclosure is a wireless communication device that performs wireless communication, including one of an antenna device and an antenna array device including at least the frequency selective surface described in the above item (1).

(3) A radar device according to the present disclosure is a radar device that transmits or receives radar signals, including one of an antenna device and an antenna array device including at least the frequency selective surface described in the above item (1).

Advantageous Effects of Invention

A frequency selective surface, a wireless communication device, and a radar device according to the present disclosure provide the following advantageous effects.

The frequency selective surface, the wireless communication device, and the radar device according to the present disclosure can easily change the capacitance value of the capacitance element disposed to straddle the slots formed on the conductor plane in the width direction, thereby making it possible to easily change operating frequencies. In other words, the frequency selective surface, the wireless communication device, and the radar device according to the present disclosure can easily replace or change only a component or a part of metallic patterns, thereby making it possible to easily adjust frequencies even after design or after production.

Figure 1:
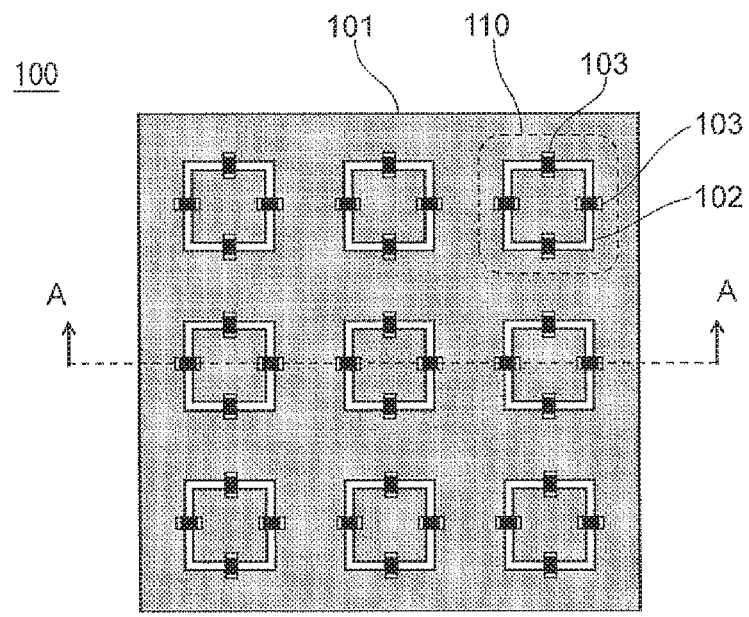
FIG. 1 is a plan view illustrating an example of a frequency selective surface according to a first embodiment of the present disclosure.

Preferred embodiments of a frequency selective surface, a wireless communication device, and a radar device according to the present disclosure will be described below with reference to the accompanying drawings. While the frequency selective surface according to the present disclosure will be described below, the present disclosure may be carried out by forming a single antenna device or antenna array device using the frequency selective surface, or may be carried out as a wireless communication device including at least one antenna or antenna array device using the frequency selective surface. Alternatively, the present disclosure may be carried out as a radar device including at least one antenna device or antenna array device using the frequency selective surface. For convenience of explanation, the following reference numerals used in the drawings are assigned to the respective elements to facilitate understanding of the present disclosure and thus are not intended to limit the present disclosure to the illustrated modes. The same reference numerals are assigned to the same components in the drawings, and descriptions thereof are omitted, as needed, in the following description.

FEATURES OF THE PRESENT DISCLOSURE

Prior to giving the description of embodiments of the present disclosure, an outline of features of the present disclosure will now be described. A main feature of the present disclosure is a frequency selective surface including a conductor plane, one or more slots each formed to be surrounded by the conductor plane, and a capacitance element that is disposed to straddle the slot in a width direction, one end or both ends of the capacitance element being connected to the conductor plane at a position near the slot, wherein one or more capacitance elements are provided for each slot, the one or more capacitance elements being disposed to straddle the slot in the width direction.

Thus, operating frequencies can be easily changed by adjusting only the capacitance value of the capacitance element disposed on each slot, without the need for changing the size of each of the slots respectively forming unit cells that are two-dimensionally periodically arranged. Consequently, operating frequencies can be easily adjusted, as needed, even after design or after production.

FIRST EMBODIMENT

Figure 2:
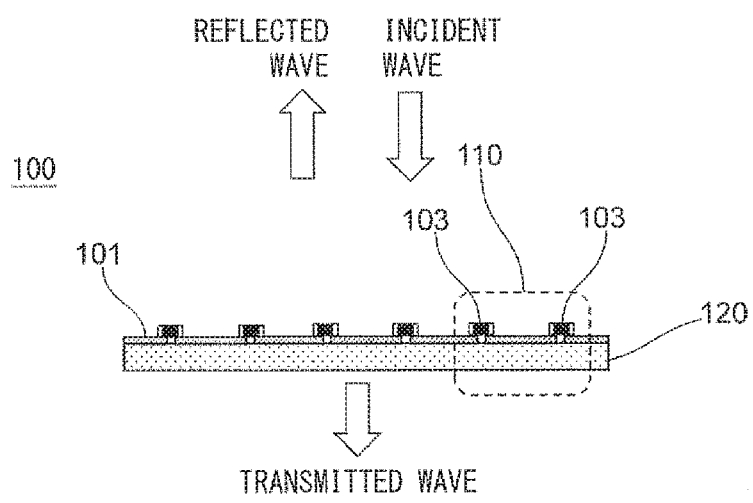
FIG. 2 is a sectional view illustrating an example of a section of the frequency selective surface taken along a segment "A" in FIG. 1.

Next, a configuration example of a frequency selective surface according to a first embodiment of the present disclosure will be described in detail with reference to FIGS. 1 and 2. FIG. 1 is a plan view illustrating an example of the frequency selective surface according to the first embodiment of the present disclosure. FIG. 2 is a sectional view illustrating an example of a section of the frequency selective surface taken along a segment "A" illustrated in FIG. 1.

As illustrated in the sectional view of FIG. 2, a frequency selective surface 100 includes at least a dielectric substrate 120, a conductor plane 101 disposed in a layer on the font surface side of the dielectric substrate 120, and one or more unit cells 110 which are periodically arranged on the conductor plane 101.

As illustrated in the plan view of FIG. 1, one or more (nine in the example illustrated in FIG. 1) unit cells 110 are two-dimensionally periodically arranged on the conductor plane 101. Each unit cell 110 includes a square loop slot 102 which is formed by opening the conductor plane 101 (i.e., formed to be surrounded by the conductor plane 101), and one or more (four in the example illustrated in FIG. 1) capacitance components 103 which are disposed on the periphery of the loop slot 102 as capacitance elements to straddle the loop slot 102 in a width direction, each capacitance component 103 having ends that are respectively connected to the conductor plane 101 at positions near one edge and another edge of the loop slot 102.

Note that the conductor plane 101 constituting the frequency selective surface 100 is generally formed of a copper foil, but instead may be formed of another material, as long as the other material has electrical conductivity. The dielectric substrate 120 that supports the conductor plane 101 may be formed using any material or any process. For example, a printed wiring board using a glass epoxy resin, an interposer substrate, such as an LSI, a module substrate using a ceramic material, such as LTCC (Low Temperature Co-fired Ceramic), or a semiconductor substrate, such as silicon, may be used.

While the case where the frequency selective surface 100 is formed on the dielectric substrate 120 has been described above, the dielectric substrate 120 need not necessarily be provided, as long as the components are disposed and connected in the manner as described above. For example, the conductor plane 101 may be produced using a sheet metal and the inside part of each loop slot 102 of the conductor plane 101 may be partially supported by a dielectric support member. In this case, a part other than the dielectric support member is hollow, and thus a dielectric loss can be reduced as compared with a case where the dielectric substrate 120 as illustrated in FIG. 2 is used.

Next, the operation and advantageous effects of the frequency selective surface 100 according to the first embodiment illustrated in FIGS. 1 and 2 will be described. In the frequency selective surface 100 according to the first embodiment, when the frequency of an electromagnetic wave incident on the frequency selective surface 100 is close to the resonance frequency of the loop slot 102, the loop slot 102 is excited and re-radiation occurs. Accordingly, the electromagnetic wave is transmitted through the frequency selective surface 100. On the other hand, when the frequency band of the electromagnetic wave incident on the frequency selective surface 100 is apart from the resonance frequency of the loop slot 102, the loop slot 102 is not sufficiently excited, so that the electromagnetic wave is reflected by the frequency selective surface 100.

In a normal loop slot like that of the prior art, when the length of the periphery of the loop matches the wavelength of the electromagnetic wave, a resonance occurs. Accordingly, if the size of the loop is determined, the resonance frequency of the loop slot is determined. Therefore, in the frequency selective surface of the related art using the normal loop slot, the resonance frequency cannot be adjusted without changing the size of the loop, so that it is difficult to adjust the operating frequencies.

On the other hand, in the frequency selective surface 100 according to the first embodiment, as illustrated in the plan view of FIG. 1, the wavelength of the electromagnetic wave to be distributed on the periphery of each loop slot 102 can be reduced depending on the magnitude of the capacitance value of the capacitance component 103 provided to straddle the loop slot 102 in the width direction. Accordingly, the resonance frequency of the loop slot 102 can be changed by the capacitance value of the capacitance component 103. For example, the capacitance component 103 is changed to a capacitance component having a larger capacitance value, thereby making it possible to shift the resonance frequency of the loop slot 102, i.e., the operating frequency of the frequency selective surface 100, to a low-frequency side.

Thus, the frequency selective surface 100 according to the first embodiment can easily adjust the operating frequencies by replacing the capacitance component 103 disposed on the loose slot 102 with a capacitance component having an appropriate capacitance value, when the operating frequency of the produced frequency selective surface 100 deviates from a designed value.

Figure 3:
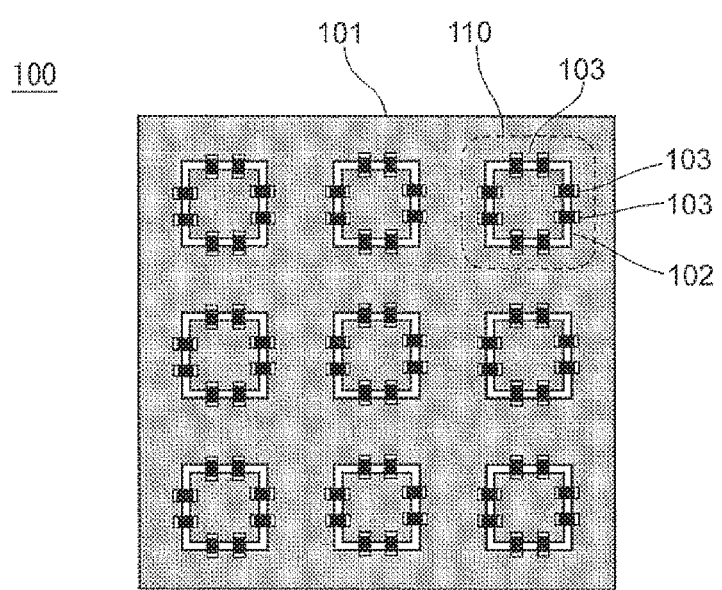
FIG. 3 is a plan view illustrating a modified example of the frequency selective surface according to the first embodiment of the present disclosure.

The number of the capacitance components 103 disposed on each loop slot 102 is not limited to the four illustrated in the plan view of FIG. 1, and four or more capacitance components 103 are preferably disposed on the periphery of each of the loop slots 102. For example, as illustrated in FIG. 3, eight of the capacitance components 103 may be provided on each loop slot 102. FIG. 3 is a plan view illustrating a modified example of the frequency selective surface 100 according to the first embodiment of the present disclosure, and illustrates a case where eight capacitance components 103 are disposed along the periphery of each loop slot 102.

However, even when less than four of the capacitance components 103 are disposed on each of the loop slots 102, there is no adverse effect on the essential effects of the present disclosure.

While the plan view of FIG. 1 illustrates a configuration example in which the capacitance components 103 are uniformly disposed on the periphery of each loop slot 102, the capacitance components need not necessarily be uniformly disposed on the periphery of each loop slot 102. The capacitance values of the plurality of (four in the case of FIG. 1) capacitance components 103 disposed on the periphery of each loop slot 102 need not necessarily be the same, but instead may be different values.

While the plan view of FIG. 1 illustrates a case where the loop shape of each loop slot 102 is a square, each loop slot 102 may have other loop shapes, such as a rectangular shape, a triangular shape, a hexagonal shape, or a circular shape. Note that if each loop slot 102 is formed to have a loop shape with high rotation symmetry, such as a square shape, a hexagonal shape, or a circular shape, polarized wave dependence with respect to transmission characteristics can be reduced.

SECOND EMBODIMENT

Figure 4:
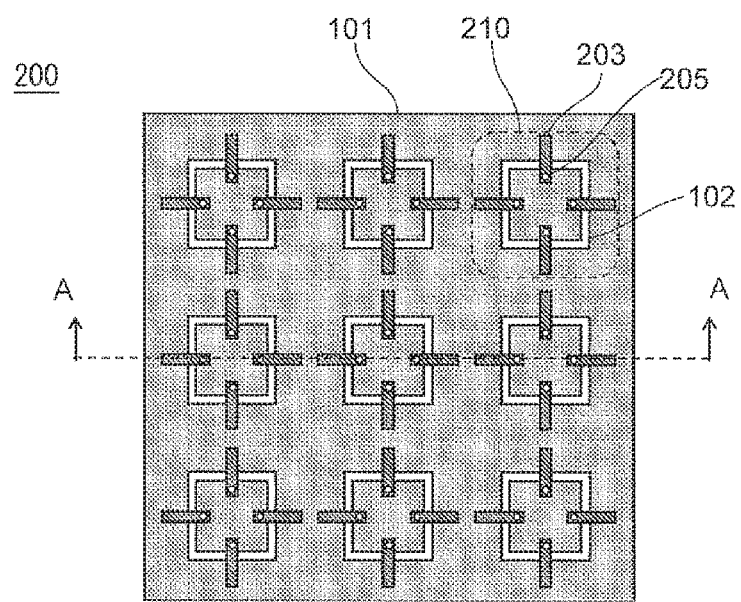
FIG. 4 is a plan view illustrating an example of a frequency selective surface according to a second embodiment of the present disclosure.
Figure 5:
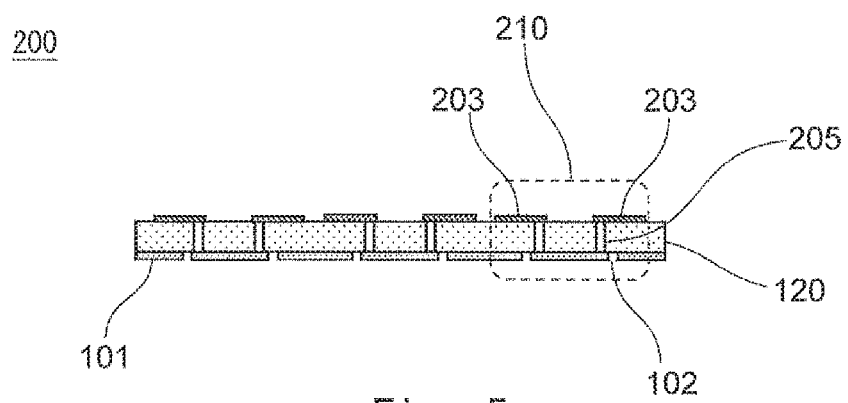
FIG. 5 is a sectional view illustrating an example of a section of the frequency selective surface taken along a segment "A" in FIG. 4.

Next, a configuration example of a frequency selective surface according to a second embodiment of the present disclosure will be described with reference to FIGS. 4 and 5. FIG. 4 is a plan view illustrating an example of the frequency selective surface according to the second embodiment of the present disclosure. FIG. 5 is a sectional view illustrating an example of a section of the frequency selective surface taken along a segment "A" illustrated in FIG. 4.

As illustrated in FIGS. 4 and 5, a frequency selective surface 200 according to the second embodiment is similar to the frequency selective surface 100 according to the first embodiment, except for the following features. That is, as illustrated in FIG. 5, the frequency selective surface 200 according to the second embodiment includes a linear open-end stub 203 (linear stub conductor) in place of the capacitance component 103 illustrated in FIG. 2 of the first embodiment as the capacitance element constituting each unit cell 210, and the open-end stub 203 is formed in such a manner that the open-end stub 203 is disposed to face the conductor plane 101 in a layer (plane) on the dielectric substrate 120 that is different from a layer (plane) of the conductor plane 101 in which the loop slots 102 are formed.

As illustrated in the plan view of FIG. 4, the open-end stub 203 is an open end that is disposed in such a manner that a part of the open-end stub 203 intersects with the corresponding loop slot 102 formed to be surrounded by the conductor plane 101 as viewed from a direction perpendicular to a surface and a front surface of a member forming an outward end of the loop slot 102 stretches so as to face a front surface of a region in the conductor plane 101 that is located outside of the loop slot 102. On the other hand, an inward end of the loop slot 102 is not an open end and is electrically connected to the conductor plane 101, which is formed in the opposed layer, with a conductor via 205, at a position near an inner edge of the loop slot 102, as illustrated in the sectional view of FIG. 5.

In the frequency selective surface 200 according to the second embodiment, the open-end stub 203 operates as a capacitance loaded in such a manner that the open-end stub straddles the corresponding loop slot 102 in a specific frequency band. Accordingly, like in the case of the frequency selective surface 100 according to the first embodiment, the wavelength of the electromagnetic wave to be distributed on the periphery of each loop slot 102 can be reduced.

When the length of the open-end stub 203 is shorter than about ¼ of the wavelength of the incident electromagnetic wave, the open-end stub 203 operates as a capacitance, and the capacitance value can be changed by changing the length of the open-end stub 203. For example, the capacitance value can be reduced by reducing the length of the open-end stub 203, and the resonance frequency of the loop slot 102, i.e., the operating frequency of the frequency selective surface 200, can be shifted to a high-frequency side.

Thus, in the frequency selective surface 200 according to the second embodiment, when the operating frequency of the produced frequency selective surface 200 deviates from a designed value, the open-end-side leading end of the open-end stub 203 disposed on the opposite side so as to intersect with the loop slot 102 is cut off so as to have an appropriate capacitance value, thereby making it possible to easily adjust the operating frequency.

Figure 6:
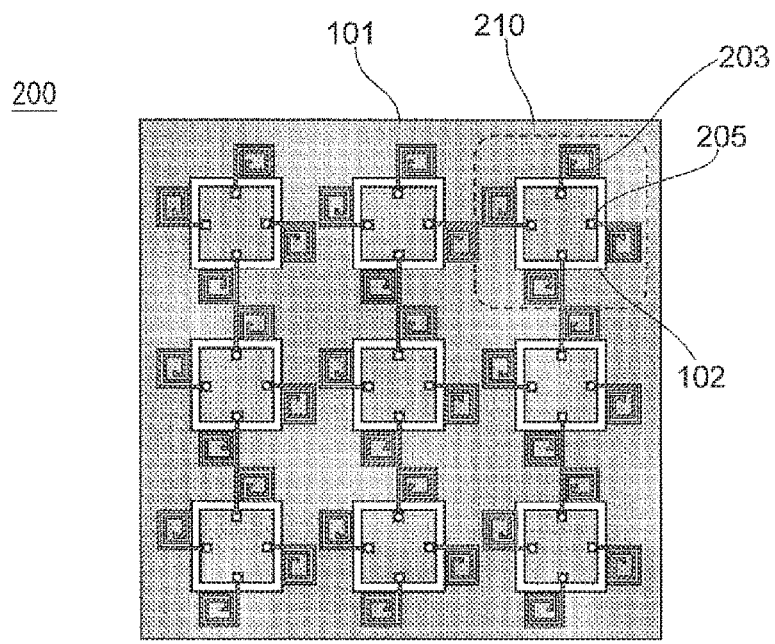
FIG. 6 is a plan view illustrating a modified example of the frequency selective surface according to the second embodiment of the present disclosure.

Examples of FIGS. 4 and 5 illustrate a case where the open-end stub 203 has a linear shape. However, the open-end stub may have any shape, as long as a length sufficient for operating in a desired frequency band can be ensured. For example, as illustrated in FIG. 6, the open-end stub 203 may have any shape such as a spiral shape or a meander shape. FIG. 6 is a plan view illustrating a modified example of the frequency selective surface 200 according to the second embodiment of the present disclosure, and illustrates a case where four open-end stubs 203 each having a spiral shape are disposed so as to intersect with the periphery of each loop slot 102.

When the open-end stubs 203 each having a spiral shape, a meander shape, or the like are employed, the open-end stubs 203 do not interfere with the adjacent unit cells 210 even if the length of each open-end stub 203 is increased. Accordingly, the interval at which the unit cells 210 are disposed can be reduced.

Figure 7:
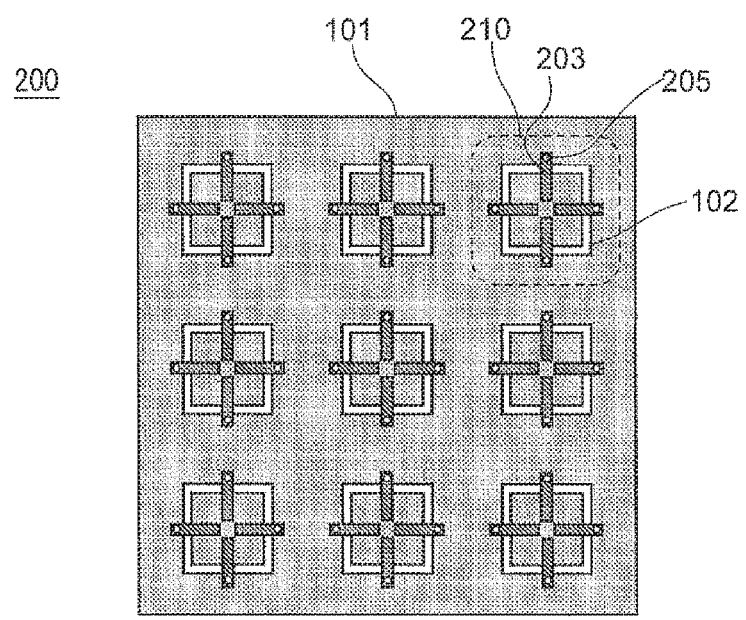
FIG. 7 is a plan view illustrating another modified example of the frequency selective surface according to the second embodiment of the present disclosure.

The examples of FIGS. 4 and 5 illustrate a configuration example in which the open-end stubs 203 and the conductor plane 101 are connected with the conductor via 205 at an inside end of each loop slot 102. However, as illustrated in FIG. 7, the open-end stubs 203 and the conductor plane 101 may be connected with the conductor via 205 at an outside end of each loop slot 102. In this case, in each of the open-end stubs 203, an inward end of the loop slot 102 is an open end. FIG. 7 is a plan view illustrating another modified example of the frequency selective surface 200 according to the second embodiment of the present disclosure, and illustrates a case where the open-end stubs 203 and the conductor plane 101 are connected with the conductor via 205 at an outside of each loop slot 102.

In an example in which the open-end stubs 203 are connected as illustrated in FIG. 7, like in the case of the open-end stubs 203 each having a spiral shape or a meander shape as illustrated in FIG. 6, even if the length of each open-end stub 203 is increased, the open-end stubs 203 do not interfere with the adjacent unit cells 210. Therefore, the interval at which the unit cells 210 are disposed can be reduced.

The conductor via 205 is generally formed by performing plate processing on a through-hole which is formed in the dielectric substrate 120 by boring a hole in the dielectric substrate 120 with a drill. However, the method for forming the conductor via is not limited only to this case, and any method may be used as long as the layers of the dielectric substrate 120 can be electrically connected. For example, the conductor via can be formed by using a laser via formed by a laser, a copper wire, or the like.

THIRD EMBODIMENT

Figure 8:
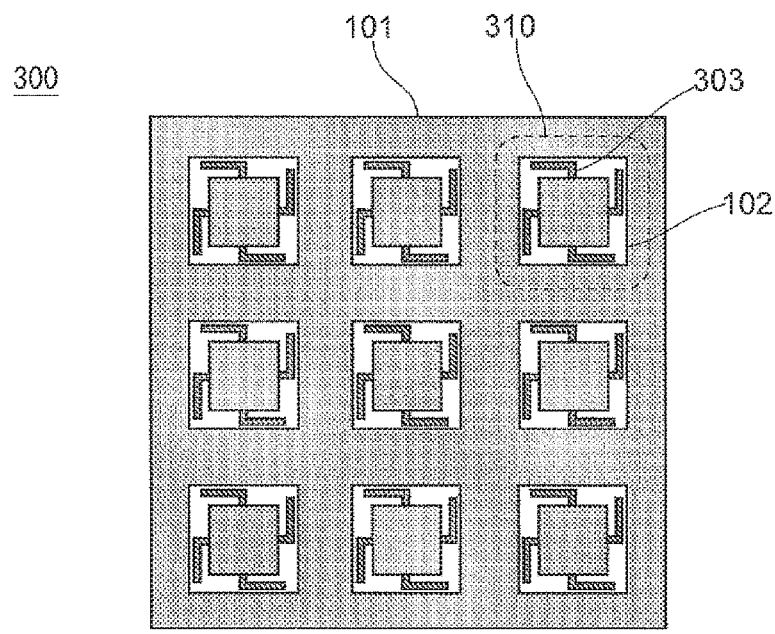
FIG. 8 is a plan view illustrating an example of a frequency selective surface according to a third embodiment of the present disclosure.

Next, a configuration example of a frequency selective surface according to a third embodiment of the present disclosure will be described in detail with reference to FIG. 8. FIG. 8 is a plan view illustrating an example of the frequency selective surface according to the third embodiment of the present disclosure.

As illustrated in FIG. 8, a frequency selective surface 300 according to the third embodiment is similar to the frequency selective surface 200 according to the second embodiment, except for the following features. Specifically, as illustrated in FIG. 8, in the frequency selective surface 300 according to the third embodiment, an open-end stub 303 (stub conductor) which is a component of each unit cell 310 is disposed in the same layer (plane) as the conductor plane 101, and is provided in a region in the loop slot 102 formed to be surrounded by the conductor plane 101.

The open-end stub 303 has an inverted L-shape and is disposed to stretch in a region within the corresponding loop slot 102 in such a manner that an outward end of the open-end stub 303 disposed along the outer periphery of the loop slot 102 formed on the conductor plane 101 is an open end and a side surface of a member forming the open end faces a side surface of the region in the conductor plane 101 at the outside of the loop slot 102. On the other hand, an inward end having an inverted L-shape is connected to the region in the conductor plane 101 at the inside of the loop slot 102. Note that the shape of the open-end stub 303 is not limited to an inverted L-shape shape, but instead may be an L-shape.

In the frequency selective surface 300 according to the third embodiment, the open-end stub 303 operates as a capacitance loaded in such a manner that the open-end stub straddles the loop slot 102 in a specific frequency band. Accordingly, like in the frequency selective surface 200 according to the second embodiment, the wavelength of the electromagnetic wave to be distributed on the periphery of the loop slot 102 can be reduced.

When the length of the open-end stub 303 is shorter than about ¼ of the wavelength of the incident electromagnetic wave, the open-end stub 303 operates as a capacitance and the capacitance value can be changed by changing the length of the open-end stub 303. For example, the capacitance value can be reduced by reducing the length of the open-end stub 303, and the resonance frequency of the loop slot 102, i.e., the operating frequency of the frequency selective surface 300, can be shifted to a high-frequency side.

Thus, in the frequency selective surface 300 according to the third embodiment, when the operating frequency of the produced frequency selective surface 300 deviates from a designed value, the open-end-side leading end of the open-end stub 303 disposed on the loop slot 102 is cut off so as to have an appropriate capacitance value, thereby making it possible to easily adjust the operating frequency.

FOURTH EMBODIMENT

Figure 9:
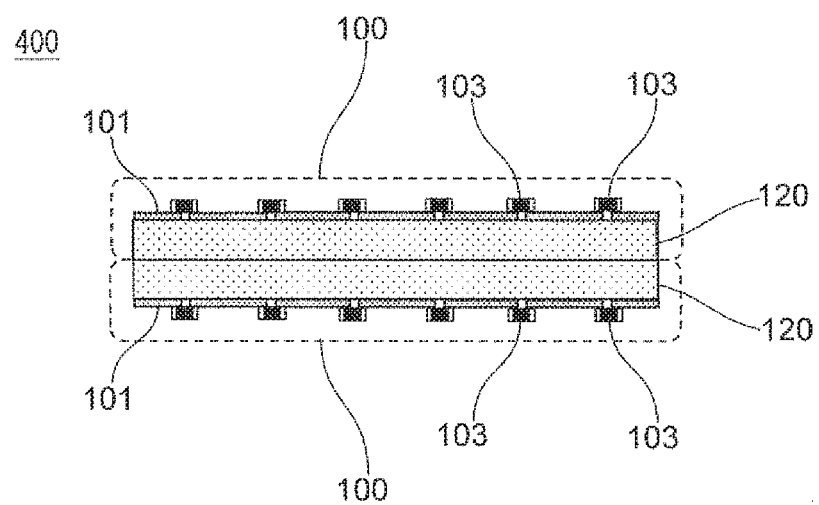
FIG. 9 is a sectional view illustrating an example of a frequency selective surface according to a fourth embodiment of the present disclosure.

Next, a configuration example of a frequency selective surface according to a fourth embodiment of the present disclosure will be described in detail with reference to FIG. 9. FIG. 9 is a sectional view illustrating an example of the frequency selective surface according to the fourth embodiment of the present disclosure.

As illustrated in FIG. 9, a frequency selective surface 400 according to the fourth embodiment has a configuration in which one frequency selective surface is formed by combining two frequency selective surfaces 100 according to the first embodiment illustrated in FIG. 2. Specifically, the frequency selective surface 400 according to the fourth embodiment has a configuration in which surfaces of the dielectric substrates 120 of the two frequency selective surfaces 100 according to the first embodiment that are opposite to the layer on which the conductor plane 101 is disposed are bonded together.

In the frequency selective surface 400 according to the fourth embodiment, the two frequency selective surfaces 100 are disposed in an overlapping state, so that the loop slots 102 formed on the respective conductor planes 101 overlap each other and the overlapping loop slots 102 can operate as a coupled resonator. Accordingly, the transmission band can be widened as compared with the case of using one frequency selective surface 100 like in the frequency selective surface 100 according to the first embodiment. Note that the bandwidth of the transmission band is determined by coupling coefficients of the overlapping loop slots 102. Therefore, the bandwidth of the transmission band can be controlled by appropriately changing the thickness of each dielectric substrate 120.

The two frequency selective surfaces 100 constituting the frequency selective surface 400 according to the fourth embodiment are preferably bonded together in such a manner that the positions of the respective loop slots 102 overlap each other in a plan view. However, even when the positions of the respective loop slots 102 deviate from each other, there is no adverse effect on the essential effects of the fourth embodiment.

Figure 10:
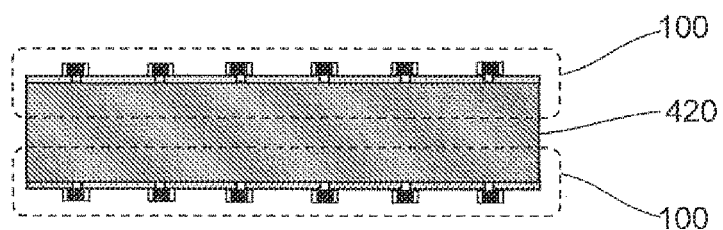
FIG. 10 is a sectional view illustrating a modified example of the frequency selective surface according to the fourth embodiment of the present disclosure.
Figure 11:
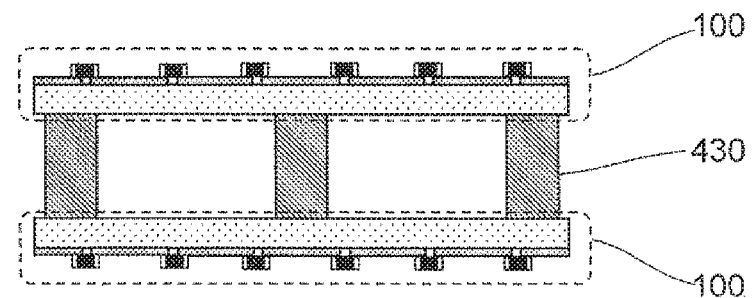
FIG. 11 is a sectional view illustrating another modified example of the frequency selective surface according to the fourth embodiment of the present disclosure.

The example of FIG. 9 illustrates a case where the dielectric substrates, which are components of the frequency selective surface 400, are formed in a state where two dielectric substrates 120 are bonded and in close contact with each other. However, the dielectric substrates, which are components of the frequency selective surface 400, may have any configuration as long as the two conductor planes 101 are disposed in an overlapping manner at a predetermined distance within an allowable range. For example, as illustrated in FIG. 10, the conductor planes 101 may be respectively disposed on the front and back surfaces of one dielectric substrate 420. Alternatively, as illustrated in FIG. 11, dielectric members 430 for partially supporting the substrates, for example, the dielectric substrates 120, which support the conductor planes 101 of the two frequency selective surfaces 100, may be provided.

FIG. 10 is a sectional view illustrating a modified example of the frequency selective surface 400 according to the fourth embodiment of the present disclosure, and illustrates a case where the frequency selective surface is formed using one dielectric substrate 420 and the conductor planes 101 are respectively disposed on the front and back surfaces of the dielectric substrate 420. FIG. 11 is a sectional view illustrating another modified example of the frequency selective surface 400 according to the fourth embodiment of the present disclosure, and illustrates a case where the dielectric members 430 for partially supporting the substrates, for example, the dielectric substrates 120, which support the conductor planes 101 of the two frequency selective surfaces 100, are disposed in a bridge shape.

While the fourth embodiment described above illustrates a configuration example in which the two frequency selective surfaces 100 are disposed in an overlapping manner, three or more frequency selective surfaces 100 may be disposed in an overlapping manner. When three or more frequency selective surfaces 100 are disposed in an overlapping manner, the transmission band can be further widened. While the fourth embodiment described above illustrates a configuration example based on the frequency selective surface 100 according to the first embodiment, configurations based on the frequency selective surface 200 according to the second embodiment or the frequency selective surface 300 according to the third embodiment may also be employed.

FIFTH EMBODIMENT

Figure 12:
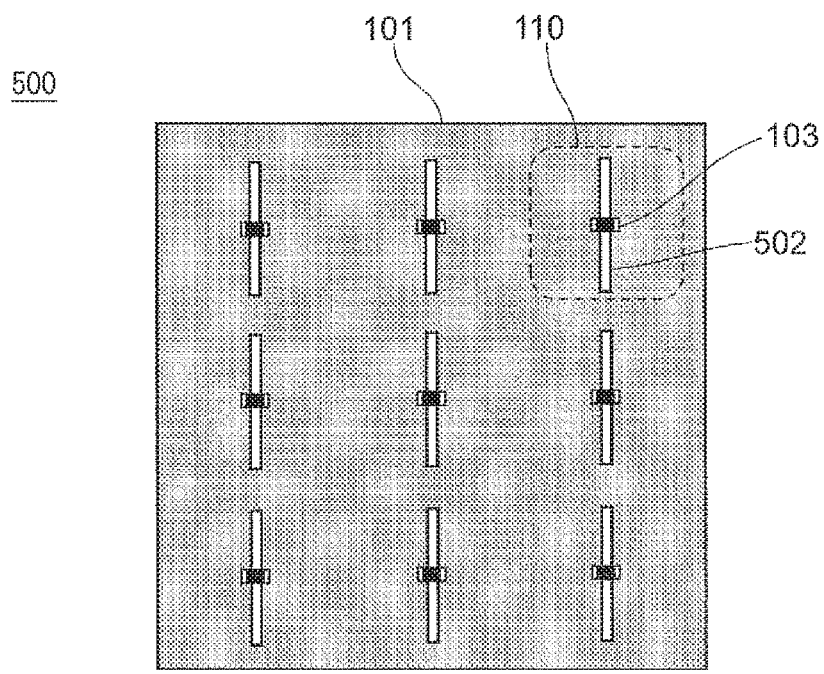
FIG. 12 is a plan view illustrating a frequency selective surface according to a fifth embodiment of the present disclosure.

Next, a configuration example of a frequency selective surface according to a fifth embodiment of the present disclosure will be described in detail with reference to FIG. 12. FIG. 12 is a plan view illustrating an example of the frequency selective surface according to the fifth embodiment of the present disclosure.

As illustrated in FIG. 12, a frequency selective surface 500 according to the fifth embodiment is similar to the frequency selective surface 100 according to the first embodiment, except for the following features. That is, as illustrated in FIG. 12, the frequency selective surface 500 according to the fifth embodiment includes linear slots 502 in place of the loop slots 102 of the first embodiment illustrated in FIG. 1 as a component of each unit cell 110, and the linear slots 502 of the respective unit cells 110 are arranged in parallel. Further, each capacitance component 103 is disposed in the vicinity of the center of the corresponding linear slot 502.

In the frequency selective surface 500 according to the fifth embodiment, when a polarized wave of an incident electromagnetic wave is perpendicular to each linear slot 502, the linear slot 502 is excited and the electromagnetic wave is transmitted through the frequency selective surface 500 like in the case of the first embodiment. On the other hand, when the polarized wave of the incident electromagnetic wave is parallel to each linear slot 502, the linear slot 502 is not excited and the electromagnetic wave is reflected by the frequency selective surface 500. Thus, the frequency selective surface 500 according to the fifth embodiment has selectivity for polarized waves, as well as selectivity for frequencies, and thus can selectively block unwanted polarized waves.

Note that the capacitance component 103 is preferably disposed in the vicinity of a position corresponding to an anti-node of an electric field in a resonance mode generated in each linear slot 502. For example, when the capacitance component 103 is disposed in a node of an electric field distribution in a first resonance mode of the corresponding linear slot 502 and in the vicinity of an anti-node of a second resonance mode, the capacitance component 103 acts mainly in the second resonance mode, so that the frequencies can be controlled in a mode selective manner. However, the position of the capacitance component 103 is not limited to the above-mentioned position. Even when the capacitance component 103 is disposed at another position, there is no adverse effect on the essential effects of the fifth embodiment.

Figure 13:
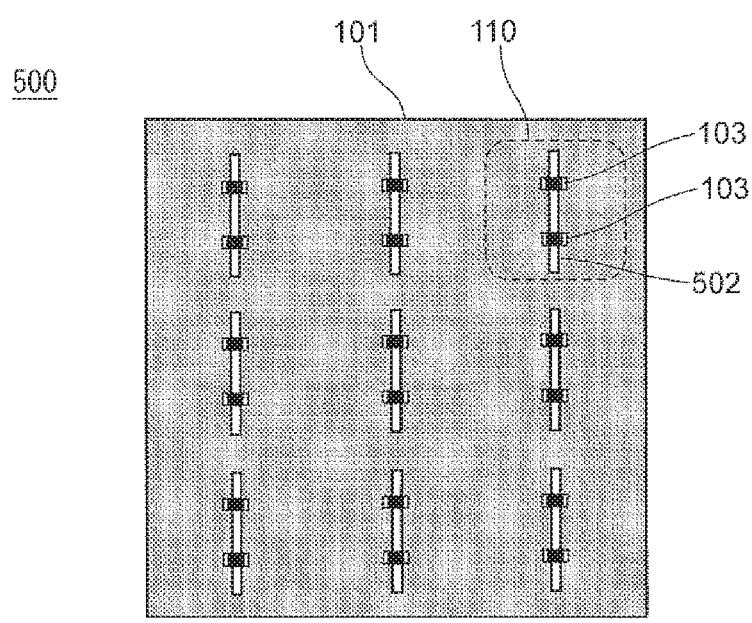
FIG. 13 is a plan view illustrating a modified example of the frequency selective surface according to the fifth embodiment of the present disclosure.

The example of FIG. 12 illustrates a case where one capacitance component 103 is provided in the vicinity of the center of each linear slot 502. However, the capacitance component 103 need not necessarily be disposed in the vicinity of the center of each linear slot 502, and the number of the capacitance components 103 is not limited to one. For example, as illustrated in FIG. 13, two capacitance components 103 may be provided at regular intervals in the lengthwise direction of the linear slot 502. FIG. 13 is a plan view illustrating a modified example of the frequency selective surface 500 according to the fifth embodiment of the present disclosure, and illustrates a case where two capacitance components 103 are provided at regular intervals in the lengthwise direction of the linear slot 502 as a component of each unit cell 110.

While the fifth embodiment described above illustrates a configuration example based on the frequency selective surface 100 according to the first embodiment, configurations based on the frequency selective surface 200 according to the second embodiment, the frequency selective surface 300 according to the third embodiment, or the frequency selective surface 400 according to the fourth embodiment may also be employed.

Figure 14:
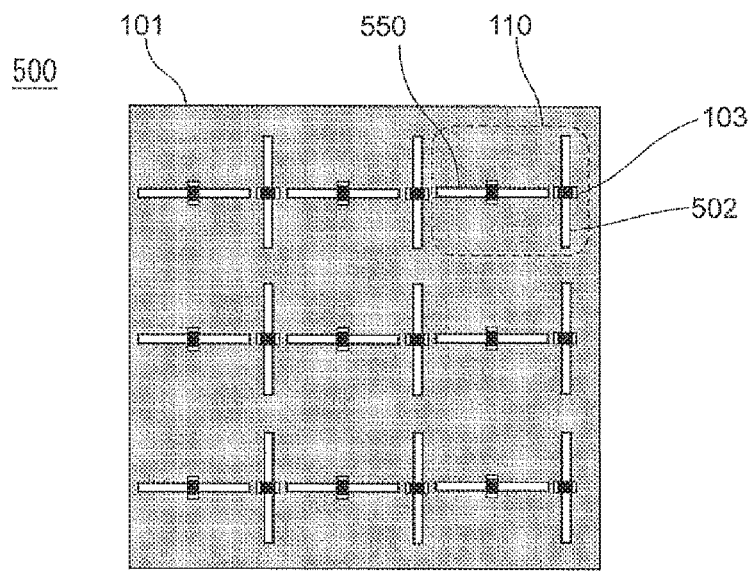
FIG. 14 is a plan view illustrating another modified example of the frequency selective surface according to the fifth embodiment of the present disclosure.

The fifth embodiment described above illustrates a configuration in which one polarized wave is selectively transmitted. However, for example, as illustrated in FIG. 14, two linear slots of the linear slot 502 and a linear slot 550 obtained by rotating the linear slot 502 by 90 degrees may be combined and disposed as a component of each unit cell 110, thereby making it possible to transmit two polarized waves. FIG. 14 is a plan view illustrating another modified example of the frequency selective surface 500 according to the fifth embodiment of the present disclosure, and illustrates a case where two linear slots of the linear slot 502 and the linear slot 550 obtained by rotating the linear slot 502 by 90 degrees are combined and disposed as a component of each unit cell 110.

SIXTH EMBODIMENT

Figure 15:
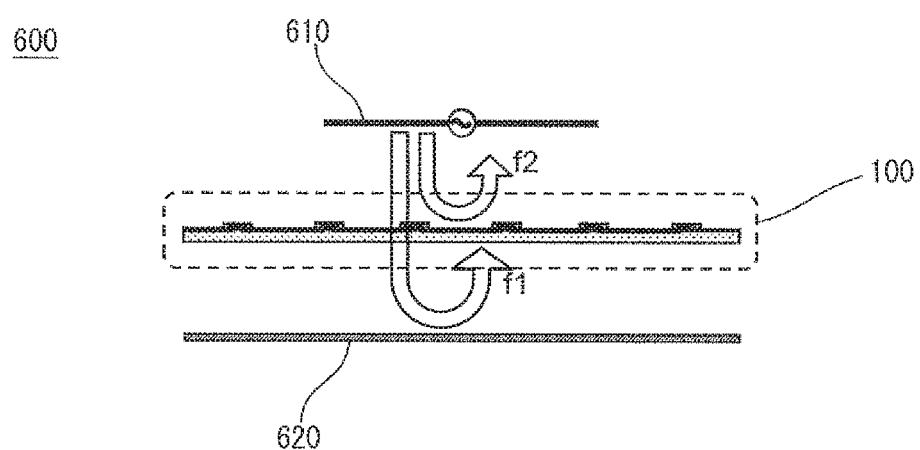
FIG. 15 is a sectional view conceptually illustrating an example of a wireless communication device according to a sixth embodiment of the present disclosure.

Next, a configuration example of a wireless communication device according to a sixth embodiment of the present disclosure will be described in detail with reference to FIG. 15. FIG. 15 is a sectional view illustrating an example of the wireless communication device according to the sixth embodiment of the present disclosure.

As illustrated in FIG. 15, a wireless communication device 600 according to the sixth embodiment is connected to a radio circuit, which is not illustrated, and includes at least a multiband antenna 610 capable of radiating at least radio signals having a first operating frequency f1 and a second operating frequency f2 into the air; the frequency selective surface 100 according to the first embodiment disposed at an interval from the multiband antenna 610; and a conductor reflector 620 which is disposed so as to face the frequency selective surface 100 at an opposite side of the multiband antenna 610 with respect to the frequency selective surface 100.

The frequency selective surface 100 is adjusted to transmit the electromagnetic wave having the first operating frequency f1 and reflect the electromagnetic wave having the second operating frequency f2. With this configuration, the wireless communication device 600 operates as a directional antenna using the conductor reflector 620 as a reflector at the first operating frequency f1, and operates as a directional antenna using the frequency selective surface 100 as a reflector at the second operating frequency f2.

At this time, the multiband antenna 610 and the conductor reflector 620 are disposed in such a manner that the distance between the multiband antenna 610 and the conductor reflector 620 is about ¼ of a free space wavelength at the first operating frequency f1 and the distance between the multiband antenna 610 and the frequency selective surface 100 is about ¼ of a free space wavelength at the second operating frequency f2. With this configuration, at both frequencies f1 and f2, conditions in which the electromagnetic wave radiated from the antenna and the electromagnetic wave reflected by the reflector are reinforced are satisfied.

With the configuration described above, the wireless communication device 600 according to this embodiment can satisfy both the directivity of the reflector and excellent radiation characteristics at a plurality of frequencies.

Figure 16:
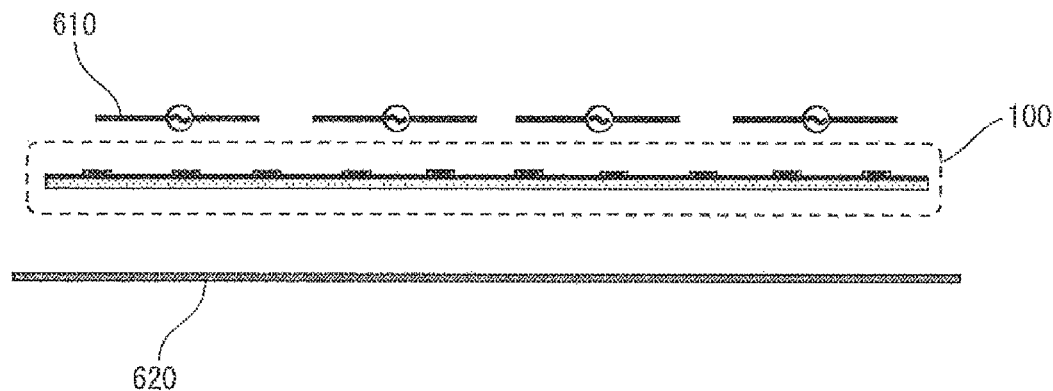
FIG. 16 is a sectional view conceptually illustrating an example of a wireless communication device having a configuration in which a plurality of multiband antennas 610 according to the sixth embodiment of the present disclosure illustrated in FIG. 15 are arranged to thereby form an antenna array.

While the above embodiment illustrates an example in which only one multiband antenna 610 is provided, a configuration in which an antenna array obtained by arranging a plurality of multiband antennas 610 as illustrated in FIG. 16 may be employed.

While the above embodiment illustrates an example in which the multiband antenna 610 operates at two frequencies, a configuration in which the multiband antenna has three or more operating frequencies may be employed. In this case, a frequency selective surface may be additionally disposed between the multiband antenna 610 and the conductor reflector 620.

While the above embodiment illustrates an example in which the frequency selective surface 100 according to the first embodiment is used as a frequency selective surface, a configuration in which the frequency selective surfaces according to other embodiments are used may also be employed.

SEVENTH EMBODIMENT

Figure 17:
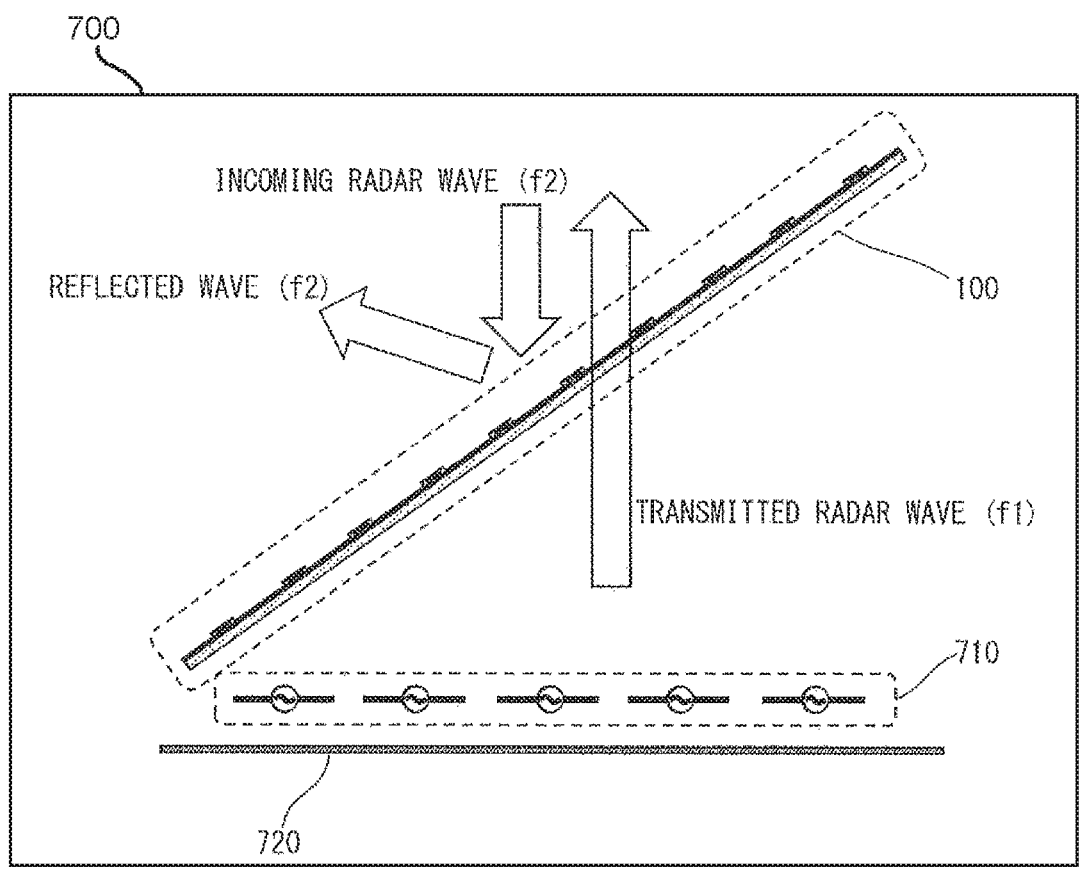
FIG. 17 is a sectional view conceptually illustrating an example of a radar device according to a seventh embodiment of the present disclosure.
Figure 18:
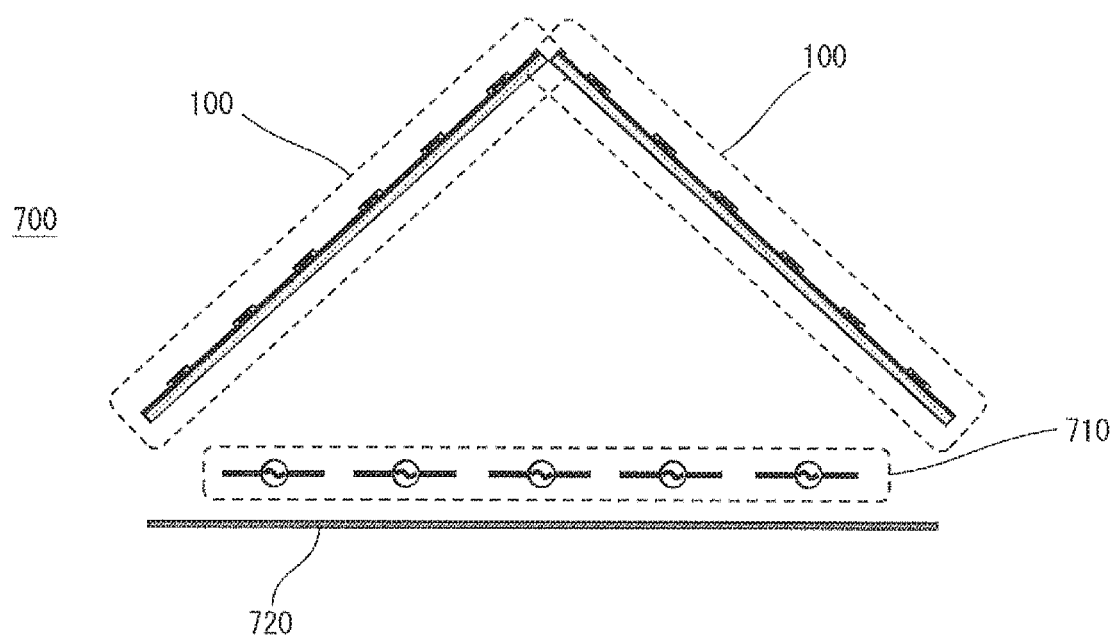
FIG. 18 is a sectional view conceptually illustrating a modified example of the radar device according to the seventh embodiment of the present disclosure.

Next, a configuration example of a radar device according to a seventh embodiment of the present disclosure will be described in detail with reference to FIG. 17. FIG. 17 is a sectional view illustrating an example of the radar device according to the seventh embodiment of the present disclosure.

As illustrated in FIG. 17, a radar device 700 according to the seventh embodiment includes an antenna array 710 that transmits radar waves toward an object to be detected, and a conductor reflector 720. The radar device further includes the frequency selective surface 100 that is disposed between the antenna array 710 and the object to be detected and is disposed with an angle with respect to the conductor reflector 720.

The frequency selective surface 100 according to the first embodiment is adjusted to transmit the electromagnetic wave having the frequency f1 of the transmitted radar wave radiated from the antenna array 710 and reflect the electromagnetic wave having the frequency f2 of an incoming radar wave transmitted from others.

With the configuration described above, the radar device 700 can reflect the incoming radar wave, which is transmitted by others toward the front surface of the radar device, to a non-front direction, thereby making it possible to achieve the radar device in which a radar cross section with respect to the front surface direction can be greatly reduced.

The above embodiment illustrates an example in which the frequency selective surface 100 has a planar shape. However, for example, as illustrated in 18, a shape obtained by combining two planes, a conical shape, or a pyramid shape may be employed as the frequency selective surface. If these shapes are employed, the Radome can be downsized.

While the above embodiment illustrates an example using the frequency selective surface 100 according to the first embodiment as a frequency selective surface, the frequency selective surfaces according to other embodiments may also be employed.

Preferred embodiments of the present disclosure have been described above. Note that it is needless to say that the above embodiments and modified examples can be combined within the range not contradicting the contents thereof. For example, in the embodiments and modified examples, a plurality of frequency selective surfaces according to any one of embodiments and modified examples may be arbitrarily selected, and the plurality of selected frequency selective surfaces may be disposed in an overlapping manner and combined as a set of frequency selective surfaces. It should be noted that the embodiments and modified examples are merely examples of the present disclosure and are not intended to limit the present disclosure. Those skilled in the art can easily understand that the present disclosure can be modified or altered in various ways depending on a particular application without departing from the gist of the present disclosure.

This application is based upon and claims the benefit of priority from Japanese patent application No. 2015-012452, filed on Jan. 26, 2015, the disclosure of which is incorporated herein in its entirety by reference.

REFERENCE SIGNS LIST

100 FREQUENCY SELECTIVE SURFACE
101 CONDUCTOR PLANE
102 LOOP SLOT
103 CAPACITANCE COMPONENT
110 UNIT CELL
120 DIELECTRIC SUBSTRATE
200 FREQUENCY SELECTIVE SURFACE
203 OPEN-END STUB
205 CONDUCTOR VIA
210 UNIT CELL
300 FREQUENCY SELECTIVE SURFACE
310 UNIT CELL
303 OPEN-END STUB
400 FREQUENCY SELECTIVE SURFACE
420 DIELECTRIC SUBSTRATE
430 DIELECTRIC MEMBER
500 FREQUENCY SELECTIVE SURFACE
502 LINEAR SLOT
550 LINEAR SLOT
600 WIRELESS COMMUNICATION DEVICE
610 MULTIBAND ANTENNA
620 CONDUCTOR REFLECTOR
700 RADAR DEVICE
710 ANTENNA ARRAY
720 CONDUCTOR REFLECTOR

The invention claimed is:

1. A frequency selective surface comprising:
a conductor plane;
one or more slots each formed to be surrounded by the conductor plane; and
a capacitance element disposed to straddle the slot in a width direction, one end or both ends of the capacitance element being connected to the conductor plane at a position near the slot,
wherein one or more capacitance elements are provided for each slot, the one or more capacitance elements being disposed to straddle the slot in the width direction,
the capacitance element is a stub conductor, and
one end of the stub conductor is connected to the conductor plane at a position near one edge of the slot, and another end of the stub conductor is an open end disposed to stretch so as to face a region of the conductor plane at another edge of the slot.

2. The frequency selective surface according to claim 1, wherein
the stub conductor has one of a linear shape, a spiral shape, and a meandering shape, and is disposed on a plane different from a plane including the conductor plane, and
a front surface of a member disposed at another end of the stub conductor stretches so as to face a front surface of a region of the conductor plane at another edge of the slot, the member forming the open end.

3. The frequency selective surface according to claim 1, wherein
the stub conductor has an inverted L-shape or an L-shape, and is disposed on the same plane as a plane including the conductor plane, and
a side surface of a member disposed at another end of the stub conductor stretches into the slot so as to face a side surface of a region of the conductor plane at another edge of the slot, the member forming the open end.

4. The frequency selective surface according to claim 1, wherein the slot is a loop slot having rotation symmetry.

5. The frequency selective surface according to according to claim 1, wherein the slot is a linear slot having linear shape.

6. A frequency selective surface that is formed by combining a plurality of frequency selective surfaces arbitrarily selected from the frequency selective surfaces according to claim 1 and disposing the selected frequency selective surfaces in an overlapping manner.

7. A wireless communication device that performs wireless communication, comprising:
one of an antenna device and an antenna array device including the frequency selective surface according to claim 1.

8. A radar device that transmits or receives radio signals, comprising:
one of an antenna device and an antenna array device including the frequency selective surface according to claim 1.

* * * * *

UNITED STATES PATENT AND TRADEMARK OFFICE
CERTIFICATE OF CORRECTION

Page 1 of 1

PATENT NO. : 10,739,437 B2
APPLICATION NO. : 15/539167
DATED : August 11, 2020
INVENTOR(S) : Hiroshi Toyao It is certified that error appears in the above-identified patent and that said Letters Patent is hereby corrected as shown below:

In the Specification

Column 5, First Embodiment, Line 67; Delete "loose" and insert --loop-- therefor In the Claims Column 14, Lines 45-46; In Claim 5, delete "according to according to" and insert --according to-- therefor Signed and Sealed this
Eighth Day of December, 2020

Andrei Iancu
*Director of the United States Patent and Trademark Office*